United States Patent
Massari et al.

(10) Patent No.: US 11,124,636 B2
(45) Date of Patent: Sep. 21, 2021

(54) PROPYLENE BASED POLYMER COMPOSITION

(71) Applicant: BASELL POLIOLEFINE ITALIA S.R.L., Milan (IT)

(72) Inventors: Paola Massari, Ferrara (IT); Claudio Cavalieri, Ferrara (IT); Marco Ciarafoni, Ferrara (IT); Roberto Pantaleoni, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 153 days.

(21) Appl. No.: 16/610,332

(22) PCT Filed: Apr. 12, 2018

(86) PCT No.: PCT/EP2018/059357
§ 371 (c)(1),
(2) Date: Nov. 1, 2019

(87) PCT Pub. No.: WO2018/202396
PCT Pub. Date: Nov. 8, 2018

(65) Prior Publication Data
US 2020/0087499 A1    Mar. 19, 2020

(30) Foreign Application Priority Data

May 4, 2017  (EP) .................................. 17169391

(51) Int. Cl.
*C08L 23/14* (2006.01)
*C08L 23/16* (2006.01)

(52) U.S. Cl.
CPC ............. *C08L 23/14* (2013.01); *C08L 23/16* (2013.01); *C08L 2203/16* (2013.01); *C08L 2205/02* (2013.01)

(58) Field of Classification Search
CPC ........... C08L 23/14; C08L 23/16; C08L 23/20
See application file for complete search history.

(56) References Cited

U.S. PATENT DOCUMENTS

| | | | |
|---|---|---|---|
| 4,399,054 A | 8/1983 | Ferraris et al. | |
| 5,538,804 A | 7/1996 | Ogale | |
| 6,573,332 B2 | 6/2003 | Kume et al. | |
| 8,779,062 B2 * | 7/2014 | Paavilainen | C09D 123/10 525/191 |
| 10,385,197 B2 * | 8/2019 | Defoer | B65D 65/40 |
| 10,611,901 B2 * | 4/2020 | Covezzi | C08J 5/18 |
| 2003/0220452 A1 | 11/2003 | Ebara et al. | |
| 2010/0305276 A1 * | 12/2010 | Pellegatti | C08L 23/16 525/240 |
| 2013/0203931 A1 * | 8/2013 | Paavilainen | C08L 23/14 524/528 |
| 2014/0005324 A1 * | 1/2014 | Reichelt | C08J 5/18 524/528 |
| 2014/0039124 A1 * | 2/2014 | Reichelt | C09D 123/142 525/53 |
| 2014/0127487 A1 * | 5/2014 | Fiebig | C08F 4/65925 428/215 |
| 2014/0134413 A1 * | 5/2014 | Fiebig | C08F 4/65925 428/216 |
| 2014/0220326 A1 * | 8/2014 | Resconi | B32B 27/34 428/216 |

FOREIGN PATENT DOCUMENTS

| | | |
|---|---|---|
| CN | 1061231 A | 5/1992 |
| EP | 45977 A2 | 2/1982 |
| EP | 361493 A1 | 4/1990 |
| EP | 0483675 A2 | 5/1992 |
| EP | 728769 A1 | 8/1996 |
| EP | 2614093 A1 | 7/2013 |
| EP | 2614094 A1 | 7/2013 |
| EP | 2820081 A1 | 1/2015 |
| JP | 2002069143 A | 3/2002 |
| JP | 20042759 A | 1/2004 |
| RU | 2004121988 A | 1/2006 |
| RU | 2586977 C2 | 6/2016 |
| RU | 2600167 C2 | 10/2016 |
| WO | 2006002778 A1 | 1/2006 |
| WO | 2009077287 A1 | 6/2009 |
| WO | 2009080485 A1 | 7/2009 |
| WO | 2015062787 A1 | 5/2015 |
| WO | 2016139163 A1 | 9/2016 |
| WO | 2016198601 A1 | 12/2016 |

OTHER PUBLICATIONS

Monomer Sequence Distribution in Ethylene-Propylene Rubber Measured by 13C NMR. 3. Use of Reaction Probability Mode C. J. Carman, R. A. Harrington and C. E. Wilkes, Macromolecules, 1977, 10, 536.

(Continued)

*Primary Examiner* — Michael M Dollinger

(57) ABSTRACT

A propylene polymer composition made from or containing:

a) from 35 wt % to 65 wt %, based upon the total weight of the propylene polymer composition, of a propylene 1-hexene copolymer containing from 10.2 to 13.0% by weight, based upon the weight of the propylene 1-hexene copolymer, of 1-hexene derived units and having a Melt Flow Rate (MFR, measured according to ASTM D 1238, 230° C./2.16 kg, (at 230° C., with a load of 2.16 kg)) from 3.5 to 12.0 g/10 min;

b) from 35 wt % to 65 wt %, based upon the total weight of the propylene polymer composition, of a propylene ethylene copolymer containing from 1.5 wt % to 6.5 wt %, based upon the weight of the propylene ethylene copolymer, of ethylene derived units and having a Melt Flow Rate (MFR, measured according to ASTM D 1238, 230° C./2.16 kg, (at 230° C., with a load of 2.16 kg)) from 3.5 to 12.0 g/10 min.

10 Claims, No Drawings

(56) References Cited

OTHER PUBLICATIONS

Carbon-13 NMR determination of monomer sequence distribution in ethylene-propylene copolymers prepared with ?-titanium trichloride—diethylaluminum chloride M. Kakugo, Y. Naito, K. Mizunuma and T. Miyatake, Macromolecules, 1982, 15, 1150.
International Search Report and Written Opinion dated May 22, 2018 (dated May 22, 2018) for Corresponding PCT/EP2018/059357.

\* cited by examiner

PROPYLENE BASED POLYMER COMPOSITION

This application is the U.S. National Phase of PCT International Application PCT/EP2018/059357, filed Apr. 12, 2018, claiming benefit of priority to European Patent Application No. 17169391.4, filed May 4, 2017, the contents of which are incorporated herein by reference in its entirety.

FIELD OF THE INVENTION

In general, the present disclosure relates to the field of chemistry. More specifically, the present disclosure relates to polymer chemistry. In particular, the present disclosure relates to a composition made from or containing a copolymer of propylene with 1-hexene and a copolymer of propylene and ethylene and films made therefrom.

BACKGROUND OF THE INVENTION

In some instances, copolymers of propylene and 1-hexene have a molecular weight distribution of monomodal type and are used for pipes systems.

In some instances, multimodal copolymers of propylene and 1-hexene are used for industrial sheets.

SUMMARY OF THE INVENTION

The present disclosure provides a propylene polymer composition made from or containing:

a) from 35 wt % to 65 wt %, based upon the total weight of the propylene polymer composition, of a propylene 1-hexene copolymer containing from 10.2 to 13% by weight, based upon the weight of the propylene 1-hexene copolymer, of 1-hexene derived units and having a Melt Flow Rate (MFR, measured according to ASTM D 1238, 230° C./2.16 kg (at 230° C., with a load of 2.16 kg)) from 3.5 to 12.0 g/10 min; and b) from 35 wt % to 65 wt %, based upon the total weight of the propylene polymer composition, of a propylene ethylene copolymer containing from 1.5 wt % to 6.5 wt %, based upon the weight of the propylene ethylene copolymer, of ethylene derived units, and having a Melt Flow Rate (MFR, measured according to ASTM D 1238, 230° C./2.16 kg (at 230° C., with a load of 2.16 kg)) from 3.5 to 12.0 g/10 min, wherein the sum of the amount of a) and b) being 100.

DETAILED DESCRIPTION OF THE INVENTION

In some embodiments, the present disclosure provides a propylene polymer composition made from or containing:

a) from 35 wt % to 65 wt %, based upon the total weight of the propylene polymer composition, alternatively from 40 wt % to 60 wt %; alternatively from 45 wt % to 55 wt %, of a propylene 1-hexene copolymer containing from 10.2 to 13.0% by weight, alternatively from 11.0 to 12.5% by weight, alternatively from 11.0 to 12.0% by weight of 1-hexene derived units, based upon the weight of the propylene 1-hexene copolymer, and having a Melt Flow Rate (MFR, measured according to ASTM D 1238, 230° C./2.16 kg (at 230° C., with a load of 2.16 kg)) from 3.5 to 12.0 g/10 min; alternatively from 3.8 to 7.5 g/10 min; alternatively from 4.0 to 6.0 g/10 min; and b) from 35 wt % to 65 wt %, based upon the total weight of the propylene polymer composition, alternatively from 40 wt % to 60 wt %, alternatively from 45 wt % to 55 wt % of a propylene ethylene copolymer containing from 1.5 wt % to 6.5 wt %, based upon the weight of the propylene ethylene copolymer; alternatively from 2.0 wt % to 6.1 wt %; alternatively from 3.5 wt % to 5.1 wt %; of ethylene derived units, and having a Melt Flow Rate (MFR, measured according to ASTM D 1238, 230° C./2.16 kg(at 230° C., with a load of 2.16 kg)) from 3.5 to 12.0 g/10 min; alternatively from 3.8 to 7.5 g/10 min; alternatively from 4.0 to 6.0 g/10 min, wherein the sum of the amount of a) and b) being 100.

In some embodiments, the propylene 1-hexene copolymer of the present disclosure contains only propylene and 1-hexene derived units. In some embodiments, the propylene ethylene copolymer of the present disclosure contains only propylene and ethylene derived units.

In some embodiments, the propylene polymer composition is used for the production of film, alternatively cast or biaxially oriented polypropylene films (BOPP) films.

In some embodiments, components a) and b) of the propylene polymer composition are obtained with polymerization processes carried out in the presence of stereospecific Ziegler-Natta catalysts supported on magnesium dihalides with a molecular weight regulator. In some embodiments, the molecular weight regulator is hydrogen.

In some embodiments, the polymerization process is continuous or batch. In some embodiments, the polymerization is operated in gas phase, in liquid phase, or by mixed liquid-gas techniques. In some embodiments, the liquid phase is operated in the presence of an inert diluent. In some embodiments, the liquid phase is operated in the absence of an inert diluent. In some embodiments, the polymerization is carried out in gas phase in two reactors.

In some embodiments, the polymerization temperature is from 20 to 100° C. In some embodiments, the polymerization pressure is atmospheric or higher.

In some embodiments, the stereospecific polymerization catalysts are made from or contains the product of a reaction between:

1) a solid component, containing a titanium compound and an electron-donor compound (internal donor) supported on magnesium dihalide;

2) an aluminum alkyl compound (cocatalyst); and, optionally, 3) an electron-donor compound (external donor).

In some embodiments, chloride is the halide in the magnesium dihalide. In some embodiments, the catalysts are capable of producing homopolymers of propylene having an isotactic index higher than 90% (measured as weight amount of the fraction insoluble in xylene at room temperature).

In some embodiments, the solid catalyst component (1) contains, as an electron-donor, a compound selected among ethers, ketones, lactones, compounds containing N, P and/or S atoms, and mono- and dicarboxylic acid esters.

In some embodiments, the catalysts are selected from the catalysts described in U.S. Pat. No. 4,399,054 and European Patent No. 45977.

In some embodiments, the electron-donor compounds are selected from the group consisting of phthalic acid esters and succinic acid esters.

In some embodiments, the succinic acid esters are represented by the formula (I):

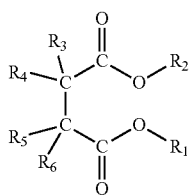

(I)

wherein the radicals $R_1$ and $R_2$, equal to or different from each other, are a C1-C20 linear or branched alkyl, alkenyl, cycloalkyl, aryl, arylalkyl or alkylaryl group, optionally containing heteroatoms; and the radicals $R_3$ to $R_6$ equal to or different from each other, are hydrogen or a C1-C20 linear or branched alkyl, alkenyl, cycloalkyl, aryl, arylalkyl or alkylaryl group, optionally containing heteroatoms. In some embodiments, the radicals $R_3$ to $R_6$ are joined to the same carbon atom and linked together to form a cycle.

In some embodiments, $R_1$ and $R_2$ are selected from the group consisting of C1-C8 alkyl, cycloalkyl, aryl, arylalkyl and alkylaryl groups. In some embodiments, $R_1$ and $R_2$ are selected from primary alkyls, alternatively branched primary alkyls. In some embodiments, $R_1$ and $R_2$ groups are selected from the group consisting of methyl, ethyl, n-propyl, n-butyl, isobutyl, neopentyl, 2-ethylhexyl. In some embodiments, $R_1$ and $R_2$ groups are selected from the group consisting of ethyl, isobutyl, and neopentyl.

In some embodiments, $R_3$ to $R_5$ are hydrogen and $R_6$ is a branched alkyl, cycloalkyl, aryl, arylalkyl and alkylaryl radical having from 3 to 10 carbon atoms. In some embodiments, at least two radicals from $R_3$ to $R_6$ are different from hydrogen and are selected from C1-C20 linear or branched alkyl, alkenyl, cycloalkyl, aryl, arylalkyl or alkylaryl group, optionally containing heteroatoms. In some embodiments, the two radicals different from hydrogen are linked to the same carbon atom. In some embodiments, the at least two radicals different from hydrogen are linked to different carbon atoms are (a) $R_3$ and $R_5$ or (b) $R_4$ and $R_6$.

In some embodiments, electron-donor compounds are 1,3-diethers of formula:

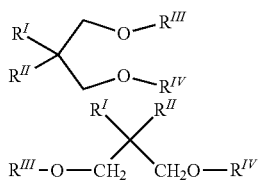

wherein $R^I$ and $R^{II}$ are the same or different and are $C_1$-$C_{18}$ alkyl, $C_3$-$C_{18}$ cycloalkyl or $C_7$-$C_{18}$ aryl radicals; $R^{III}$ and $R^{IV}$ are the same or different and are $C_1$-$C_4$ alkyl radicals; or are the 1,3-diethers wherein the carbon atom in position 2 belongs to a cyclic or polycyclic structure made up of 5, 6, or 7 carbon atoms, or of 5-n or 6-n' carbon atoms, and respectively n nitrogen atoms and n' heteroatoms selected from the group consisting of N, O, S and Si, where n is 1 or 2 and n' is 1, 2, or 3, said structure containing two or three unsaturations (cyclopolyenic structure), and optionally being condensed with other cyclic structures, or substituted with one or more substituents selected from the group consisting of linear or branched alkyl radicals; cycloalkyl, aryl, aralkyl, alkaryl radicals and halogens, or being condensed with other cyclic structures and substituted with one or more of the above mentioned substituents that can also be bonded to the condensed cyclic structures; one or more of the above mentioned alkyl, cycloalkyl, aryl, aralkyl, or alkaryl radicals and the condensed cyclic structures optionally containing one or more heteroatom(s) as substitutes for carbon or hydrogen atoms, or both.

In some embodiments, the ethers are as described in published European Patent Application Nos. 361493 and 728769.

In some embodiments, the diethers are selected from the group consisting of 2-methyl-2-isopropyl-1,3-dimethoxypropane, 2,2-diisobutyl-1,3-dimethoxypropane, 2-isopropyl-2-cyclopentyl-1,3-dimethoxypropane, 2-isopropyl-2-isoamyl-1,3-dimethoxypropane, and 9,9-bis (methoxymethyl) fluorene.

In some embodiments, electron-donor compounds are phthalic acid esters. In some embodiments, the phthalic acid esters are selected from the group consisting of diisobutyl, dioctyl, diphenyl and benzylbutyl phthalate.

In some embodiments, trialkyl aluminum compounds are used as cocatalysts (2). In some embodiments, the trialkyl aluminium compounds are selected from the group consisting of Al-triethyl, Al-triisobutyl and Al-tri-n-butyl.

In some embodiments, the electron-donor compounds (3) are used as external electron-donors (added to the Al-alkyl compound) and are made from or contain aromatic acid esters, heterocyclic compounds, and silicon compounds containing at least one Si—OR bond (where R is a hydrocarbon radical). In some embodiments, the aromatic acid esters are alkylic benzoates. In some embodiments, the heterocyclic compounds are selected from the group consisting of 2,2,6,6-tetramethylpiperidine and 2,6-diisopropylpiperidine. In some embodiments, the silicon compounds have the formula $R_a^1 R_b^2 Si(OR^3)_c$, where a and b are integer numbers from 0 to 2, c is an integer from 1 to 3 and the sum (a+b+c) is 4; $R^1$, $R^2$, and $R^3$ are alkyl, cycloalkyl or aryl radicals with 1-18 carbon atoms optionally containing heteroatoms.

In some embodiments, the silicon compound is thexyltrimethoxysilane (2,3-dimethyl-2-trimethoxysilyl-butane).

In some embodiments, the 1,3-diethers are used as external donors. In some embodiments, when the internal donor is a 1,3-diether, the external donor is omitted.

In some embodiments, the catalysts are precontacted with small quantities of olefin (prepolymerization), maintaining the catalyst in suspension in a hydrocarbon solvent, and polymerizing at temperatures from room to 60° C., thereby producing a quantity of polymer from 0.5 to 3 times the weight of the catalyst.

In some embodiments, components a) and b) are blended.

In some embodiments, the composition according to the present disclosure is prepared by sequential polymerization in two or more reactors wherein in the first reactor component b) is prepared and then component a) is prepared in a subsequent reactor in the presence of component b).

In some embodiments, the composition of the present disclosure contains additives, clarifying agents and processing aids. In some embodiments, the additives are used for nucleating and In some embodiments, the propylene polymer composition of the present disclosure is used for the production of films. In some embodiments, cast or BOPP film mono or multilayer have at least one layer made from or containing the composition of the present disclosure.

Examples

The following examples are given for illustration without limiting purpose.

The data relating to the polymeric materials and the films of the examples are determined by way of the methods reported below.

Melting Temperature (ISO 11357-3)

Determined by differential scanning calorimetry (DSC). A sample weighing 6±1 mg, was heated to 200±1° C. at a rate of 20° C./min and kept at 200±1° C. for 2 minutes in nitrogen stream. The sample was thereafter cooled at a rate of 20° C./min to 40±2° C., thereby kept at this temperature for 2 min to crystallize the sample. Then, the sample was again fused at a temperature rise rate of 20° C./min up to 200° C.±1. The melting scan was recorded, a thermogram was obtained (° C. vs. mW), and, from this, temperatures corresponding to peaks were read. The temperature corresponding to the most intense melting peaks recorded during the second fusion was taken as the melting temperature.

Melt Flow Rate (MFR)

Determined according to ASTM D 1238, at 230° C., with a load of 2.16 kg.

Solubility in Xylene at 25° C.

2.5 g of polymer and 250 ml of xylene were introduced in a glass flask equipped with a refrigerator and a magnetic stirrer. The temperature was raised in 30 minutes up to the boiling pint of the solvent. The obtained clear solution was then kept under reflux and stirring for further 30 minutes. The closed flask was then kept for 30 minutes in a bath of ice and water and in thermostatic water bath at 25° C. for 30 minutes as well. The formed solid was filtered on quick filtering paper. 100 ml of the filtered liquid was poured in a pre-weighed aluminium container, which was heated on a heating plate under nitrogen flow, to remove the solvent by evaporation. The container was then kept in an oven at 80° C. under vacuum until constant weight was obtained. The weight percentage of polymer soluble in xylene at room temperature was then calculated.

Intrinsic Viscosity (IV)

Determined in tetrahydronaphthalene at 135° C.

$^{13}$C NMR of Propylene/Ethylene Copolymers $^{13}$C NMR spectra were acquired on a Bruker AV-600 spectrometer equipped with cryoprobe, operating at 160.91 MHz in the Fourier transform mode at 120° C.

The peak of the $S_{\beta\beta}$ carbon (nomenclature according to "Monomer Sequence Distribution in Ethylene-Propylene Rubber Measured by 13C NMR. 3. Use of Reaction Probability Mode" C. J. Carman, R. A. Harrington and C. E. Wilkes, Macromolecules, 1977, 10, 536) was used as internal reference at 29.9 ppm. The samples were dissolved in 1,1,2,2-tetrachloroethane-d2 at 120° C. with an 8% wt/v concentration. Each spectrum was acquired with a 90° pulse, 15 seconds of delay between pulses and CPD to remove 1H-13C coupling. 512 transients were stored in 32K data points using a spectral window of 9000 Hz.

The assignments of the spectra, the evaluation of triad distribution and the composition were made according to Kakugo ("Carbon-13 NMR determination of monomer sequence distribution in ethylene-propylene copolymers prepared with δ-titanium trichloride-diethylaluminum chloride" M. Kakugo, Y. Naito, K. Mizunuma and T. Miyatake, Macromolecules, 1982, 15, 1150) using the following equations:

$$PPP=100T_{\beta\beta}/S \quad PPE=100T_{\beta\delta}/S \quad EPE=100T_{\delta\delta}/S$$

$$PEP=100S_{\beta\beta}/S \quad PEE=100S\beta\delta/S \quad EEE=100(0.25S_{\gamma\delta}+0.5S_{\delta\delta})/S$$

$$S=T_{\beta\beta}+T_{\beta\delta}+T_{\delta\delta}+S_{\beta\beta}+S_{\beta\delta}+0.25S_{\gamma\delta}+0.5S_{\delta\delta}$$

The molar percentage of ethylene content was evaluated using the following equation:

E % mol=100*[PEP+PEE+EEE] The weight percentage of ethylene content was evaluated using the following equation:

$$E\% \text{ wt.} = \frac{100 * E\% \text{ mol} * MW_E}{E\% \text{ mol} * MW_E + P\% \text{ mol} * MW_P}$$

where P % mol is the molar percentage of propylene content while $MW_E$ and $MW_P$ are the molecular weights of ethylene and propylene, respectively.

The product of reactivity ratio $r_1r_2$ was calculated according to Carman (C. J. Carman, R. A. Harrington and C. E. Wilkes, Macromolecules, 1977; 10, 536) as:

$$r_1r_2 = 1 + \left(\frac{EEE+PEE}{PEP}+1\right) - \left(\frac{P}{E}+1\right)\left(\frac{EEE+PEE}{PEP}+1\right)^{0.5}$$

The tacticity of Propylene sequences was calculated as mm content from the ratio of the PPP mm $T_{\beta\beta}$ (28.90-29.65 ppm) and the whole $T_{\beta\beta}$ (29.80-28.37 ppm)

1-hexene and ethylene content:

Determined by $^{13}$C-NMR spectroscopy in terpolymers:

NMR analysis. $^{13}$C NMR spectra were acquired on an AV-600 spectrometer operating at 150.91 MHz in the Fourier transform mode at 120° C. The peak of the propylene CH was used as internal reference at 28.83. The $^{13}$C NMR spectrum was acquired using the following parameters:

| Spectral width (SW) | 60 ppm |
| Spectrum centre (O1) | 30 ppm |
| Decoupling sequence | WALTZ 65_64pl |
| Pulse program [1] | ZGPG |
| Pulse Length (P1) [2] | for 90° |
| Total number of points (TD) | 32K |
| Relaxation Delay [2] | 15 s |
| Number of transients [3] | 1500 |

The total amount of 1-hexene and ethylene as molar percent was calculated from diad using the following relations:

$$[P]=PP+0.5PH+0.5PE$$

$$[H]=HH+0.5PH$$

$$[E]=EE+0.5PE$$

Assignments of the $^{13}$C NMR spectrum of propylene/1-hexene/ethylene copolymers have been calculated according to the following table:

| Area | Chemical Shift | Assignments | Sequence |
|---|---|---|---|
| 1 | 46.93-46.00 | $S_{\alpha\alpha}$ | PP |
| 2 | 44.50-43.82 | $S_{\alpha\alpha}$ | PH |

-continued

| Area | Chemical Shift | Assignments | Sequence |
|------|----------------|-------------|----------|
| 3 | 41.34-4.23 | $S_{\alpha\alpha}$ | HH |
| 4 | 38.00-37.40 | $S_{\alpha\gamma} + S_{\alpha\delta}$ | PE |
| 5 | 35.70-35.0 | $4B_4$ | H |
| 6 | 35.00-34.53 | $S_{\alpha\gamma} + S_{\alpha\delta}$ | HE |
| 7 | 33.75 33.20 | CH | H |
| 8 | 33.24 | $T_{\delta\delta}$ | EPE |
| 9 | 30.92 | $T_{\beta\delta}$ | PPE |
| 10 | 30.76 | $S_{\gamma\gamma}$ | χEEχ |
| 11 | 30.35 | $S_{\gamma\delta}$ | χEEE |
| 12 | 29.95 | $S_{\delta\delta}$ | EEE |
| 13 | 29.35 | $3B_4$ | H |
| 14 | 28.94-28.38 | CH | P |
| 15 | 27.43-27.27 | $S_{\beta\delta}$ | χEE |
| 16 | 24.67-24.53 | $S_{\beta\beta}$ | χEχ |
| 17 | 23.44-23.35 | $2B_4$ | H |
| 18 | 21.80-19.90 | $CH_3$ | P |
| 19 | 14.22 | $CH_3$ | H |

The 1-hexene content of component a) was calculated from the 1-hexene total content of the composition by using the formula $C6_{tot} = C6_a \times W_a$, wherein C6 was the 1-hexene content and Wa was the amount of component a.

Seal Initiation Temperature (SIT)

Preparation of the Film Specimens

Some films with a thickness of 50 μm were prepared by extruding each test composition in a single screw Collin extruder (length/diameter ratio of screw 1:25) at a film drawing speed of 7 m/min and a melt temperature do 210-250° C. Each resulting film was superimposed on a 1000 μm thick film of a propylene homopolymer having a xylene insoluble fraction of 97 wt % and an MFR L of 2 g/10 min. The superimposed films were bonded to each other in a Carver press at 200° C. under a 9000 kg load, which was maintained for 5 minutes. The resulting laminates were stretched longitudinally and transversally, that is, biaxially, by a factor of 6 with a Karo 4 Brueckener film stretcher at 160° C., thereby obtaining a 20 m thick film (18 μm homopolymer+2 μm test).

Determination of the SIT.

Film Strips, 6 cm wide and 35 cm length were cut from the center of the BOPP film. The film was superimposed with a BOPP film made of PP homopolymer. The superimposed specimens were sealed along one of the 2 cm sides with a Brugger Feinmechanik Sealer, model HSG-ETK 745. Sealing time was 5 seconds at a pressure of 0.14 MPa (20 psi). The starting sealing temperature was from about 10° C. less than the melting temperature of the test composition. The sealed strip was cut in 6 specimens 15 mm wide long enough to be claimed in the tensile tester grips. The seal strength was tested at a load cell capacity 100 N, cross speed 100 mm/min and grip distance 50 mm. The results were expressed as the average of maximum seal strength (N). The unsealed ends were attached to an Instron machine where the sample specimens were tested at a traction speed of 50 mm/min.

The test was repeated by changing the temperature as follows:

If seal strength <1.5 N then increase the temperature
If seal strength >1.5 N then decrease the temperature Temperature variation were adjusted stepwise. If seal strength was close to target, steps of 1° C. were selected. If the strength was far from target, steps of 2° C. were selected.

The target seal strength (SIT) was defined as the lowest temperature at which a seal strength higher or equal to 1.5 N was achieved.

Determination of the Haze

50 μm film specimens prepared as described above for the SIT measure were used. The haze value was measured using a Gardner photometric unit connected to a Hazemeter type UX-10 or an equivalent instrument having G.E. 1209 light source with filter "C". Reference samples were used for calibrating the instrument.

Preparation of the Copolymer

Catalyst System

In a 500 ml cylindric glass reactor equipped with a filtering barrier, 225 ml of $TiCl_4$ are introduced at 0° C. While under agitation in a period of 15 minutes, 10.1 g (54 mmoles) of microspheroidal $MgCl_2 \cdot 2.1$ $C_2H_5OH$ was obtained.

At the end of the addition, the temperature was brought to 70° C., and 9 mmoles of 9,9-bis(methoxymethyl)fluorene were introduced. The temperature was increased to 100° C. and, after 2 hours, the $TiCl_4$ was removed by filtration. 200 ml of $TiCl_4$ and 9 mmoles of 9,9-bis(methoxymethyl)fluorene were added; after 1 hour at 110° C. the content was filtered again and another 200 ml of $TiCl_4$ were added, continuing the treatment at 110° C. for one more hour; finally, the content was filtered and washed at 60° C. with n-heptane until the chlorine ions disappeared from the filtrate.

The microspheroidal $MgCl_2 \cdot 2.1$ $C_2H_5OH$ was prepared as follows. 48 g of anhydrous $MgCl_2$, 77 g of anhydrous $C_2H_5OH$, and 830 ml of kerosene were fed, in inert gas and at ambient temperature, in a 2-liter autoclave equipped with a turbine agitator and drawing pipe. The contents were heated to 120° C. while stirring, thereby forming the adduct between $MgCl_2$ and the alcohol that melted and remained mixed with the dispersing agent. The nitrogen pressure inside the autoclave was maintained at 15 atm. The drawing pipe of the autoclave was heated externally to 120° C. with a heating jacket, had an inside diameter of 1 mm, and was 3 meters long from a first end of the heating jacket to the second end. Then the mixture was caused to flow through the pipe at a velocity of 7 m/sec ca.

At the exit of the pipe the dispersion was gathered in a 5 l flask, under agitation, containing 2.5 l of kerosene, and being externally cooled by way of a jacket maintained at an initial temperature of −40° C. The final temperature of the dispersion was 0° C. The spherical solid product that constituted the dispersed phase of the emulsion was separated by settling and filtration, and then washed with heptane and dried. The operations were carried out in an inert gas atmosphere.

130 g of $MgCl_2$ 3 $C_2H_5OH$ in the form of spherical solid particles with a maximum diameter less than or equal to 50 micron, were obtained.

The alcohol was removed from the product at temperatures that gradually increase from 50° C. to 100° C. in nitrogen current until the alcohol content was reduced to 2.1 moles per mole of MgCl2.

Catalyst System and Prepolymerization Treatment

Before introducing the solid catalyst component into the polymerization reactor, the solid catalyst component described was contacted at 15° C. for about 6 minutes with aluminum triethyl (TEAL) and dicyclopentyl dimethoxy silane (DCPMS) as external donor.

The catalyst system was then subjected to prepolymerization by maintaining the catalyst system in suspension in liquid propylene at 20° C. for about 20 minutes before introducing the catalyst system into the polymerization reactor.

Polymerization

Into a first gas phase polymerization reactor, a propylene ethylene copolymer (component (a)) was produced by feeding in a continuous and constant flow the prepolymerized catalyst system, hydrogen (used as molecular weight regulator), propylene and ethylene in the gas state.

The polypropylene copolymer produced in the first reactor was discharged in a continuous flow and, after having been purged of unreacted monomers, was introduced, in a continuous flow, into a second gas phase polymerization reactor, together with quantitatively constant flows of hydrogen, 1-hexene and propylene in the gas state.

The polymerization conditions are reported in Table 1.

TABLE 1

|  |  | comp ex1 | comp ex2 | comp ex3 | Ex4 |
|---|---|---|---|---|---|
| catalyst feed | g/h | 9.8 | 9.5 | 11.2 | 9.2 |
| TEAL/solid catalyst component weight ratio | g/g | 4 | 4.3 | 3.5 | 4.2 |
| TEAL/D donor weight ratio | g/g | 9.5 | 14.1 | 9.1 | 28 |
| First gas phase reactor |  |  |  |  |  |
| Polymerization temperature | °C. | 70 | 70 | 70 | 70 |
| Pressure | barg | 16 | 16 | 16 | 16 |
| H2/C3 | mol/mol | 0.003 | 0.003 | 0.004 | 0.004 |
| C2/C2 + C3 | mol/mol | 0.037 | 0.038 | 0.039 | 0.045 |
| split first reactor (amount a) | wt % | 35 | 34 | 42 | 46 |
| Second gas phase reactor |  |  |  |  |  |
| Polymerization temperature | °C. | 86 | 86 | 86 | 86 |
| Pressure | barg | 16 | 16 | 16 | 15 |
| H2/C3 | mol/mol | 0.008 | 0.007 | 0.007 | 0.004 |
| C6/C6 + C3 | mol/mol | 0.11 | 0.12 | 0.12 | 0.15 |
| split second reactor (amount B) | wt % | 65 | 66 | 58 | 54 |

C3=propylene; C6=1-hexene H2=hydrogen

The polymer obtained according to Table 1 was mixed with 0.05% Irg.1010; 0.1% Irg.168 and 0.05% CaSt then pelletized. The features of the compositions are reported in Table 2.

TABLE 2

|  |  | comp Ex1 | comp Ex2 | Comp Ex 3 | Ex 4 |
|---|---|---|---|---|---|
| component a) |  |  |  |  |  |
| MFR | g/10' | 6.2 | 6.7 | 5.4 | 5.4 |
| C2-% content | % | 4.8 | 4.7 | 5.4 | 5.0 |
| component b) |  |  |  |  |  |
| MFR* | gr/10' | 5.7 | 5.5 | 5.5 | 4.2 |
| split |  | 65 | 66 | 58 | 54 |
| C6** | | 7.8 | 8.5 | 8.3 | 10.9 |
| composition |  |  |  |  |  |
| MFR tot | g/10' | 5.9 | 5.9 | 6.0 | 4.7 |
| C2-% tot | % | 1.7 | 1.6 | 2.3 | 2.3 |
| C6-% content tot | % | 5.1 | 5.6 | 4.8 | 5.9 |

TABLE 2-continued

|  |  | comp Ex1 | comp Ex2 | Comp Ex 3 | Ex 4 |
|---|---|---|---|---|---|
| Xylene Soluble 0°/25° | % | 7.5 | 8.2 | 7.9 | 14.2 |
| Xylene Soluble 25/25° | % | 14.6 | 15.3 | 14.1 | 23.8 |
| Tm | °C. | 131.8 | 130.3 | 132.5 | 130.3 |
| Tc | °C. | 86.5 | 85.6 | 86.5 | 81.9 |
| SIT on BOPP film (RDM) | °C. | 94 | 94 | 92 | 75 |
| Haze (Cast Film) | % | 0.25 | 0.22 | 0.27 | 0.35 |
| Tm-sit | °C. | 37.8 | 36.3 | 40.5 | 55.3 |

*calculated by using the formula logMFRtot = logMFRa + logMFRb
**calculated by using the formula C6tot = Xb*C6b wherein Xb is the split (Xa + Xb = 1)

What is claimed is:

1. A propylene polymer composition comprising:
   a) from 35 wt % to 65 wt %, based upon the total weight of the propylene polymer composition, of a propylene 1-hexene copolymer containing from 10.2 to 13.0% by weight, based upon the weight of the propylene 1-hexene copolymer, of 1-hexene derived units and having a Melt Flow Rate (MFR) measured according to ASTM D 1238,230° C./2.16 kg from 3.5 to 12.0 g/10 min; and
   b) from 35 wt % to 65 wt %, based upon the total weight of the propylene polymer composition, of a propylene ethylene copolymer containing from 1.5 wt % to 6.5 wt %, based upon the weight of the propylene ethylene copolymer, of ethylene derived units and having a Melt Flow Rate (MFR) measured according to ASTM D 1238,230° C./2.16 kg from 3.5 to 12.0 g/10 min,
   wherein the sum of the amount of a) and b) being 100.

2. The propylene polymer composition according to claim 1 wherein component a) ranges from 40 wt % to 60 wt %; and component b) ranges from 40 wt % to 60 wt %.

3. The propylene polymer composition according to claim 2 wherein component a) ranges from 45 wt % to 55 wt % and component b) ranges from 45 wt % to 55 wt %.

4. The propylene polymer composition according to claim 1 wherein component a) contains from 11.0 to 12.5% by weight of 1-hexene derived units.

5. The propylene polymer composition according to claim 1 wherein component b) contains from 2.0 wt % to 6.1 wt % of ethylene derived units.

6. The propylene polymer composition according to claim 1 wherein in component a) the Melt Flow Rate (MFR) measured according to ASTM D 1238,230° C./2.16 kg ranges from 3.8 to 7.5 g/10 min.

7. The propylene polymer composition according to claim 1 wherein in component b) the Melt Flow Rate (MFR) measured according to ASTM D 1238,230° C./2.16 kg ranges from 3.8 to 7.5 g/10 min.

8. A film comprising the propylene polymer composition according to claim 1.

9. The film of claim 8 being a cast film.

10. The film of claim 8 being a biaxially oriented polypropylene (BOPP) film.

* * * * *

UNITED STATES PATENT AND TRADEMARK OFFICE
CERTIFICATE OF CORRECTION

PATENT NO. : 11,124,636 B2
APPLICATION NO. : 16/610332
DATED : September 21, 2021
INVENTOR(S) : Massari et al.

It is certified that error appears in the above-identified patent and that said Letters Patent is hereby corrected as shown below:

On the Title Page

Item [30], Line 1, delete "17169391" and insert -- 17169391.4 --, therefor

In the Specification

In Column 7, Line 39, delete "20 m" and insert -- 20 µm --, therefor

Signed and Sealed this
Twenty-fourth Day of January, 2023

Katherine Kelly Vidal
*Director of the United States Patent and Trademark Office*